W. B. INGLIS.
SPRAYING APPARATUS.
APPLICATION FILED SEPT. 3, 1909.
956,101.
Patented Apr. 26, 1910.
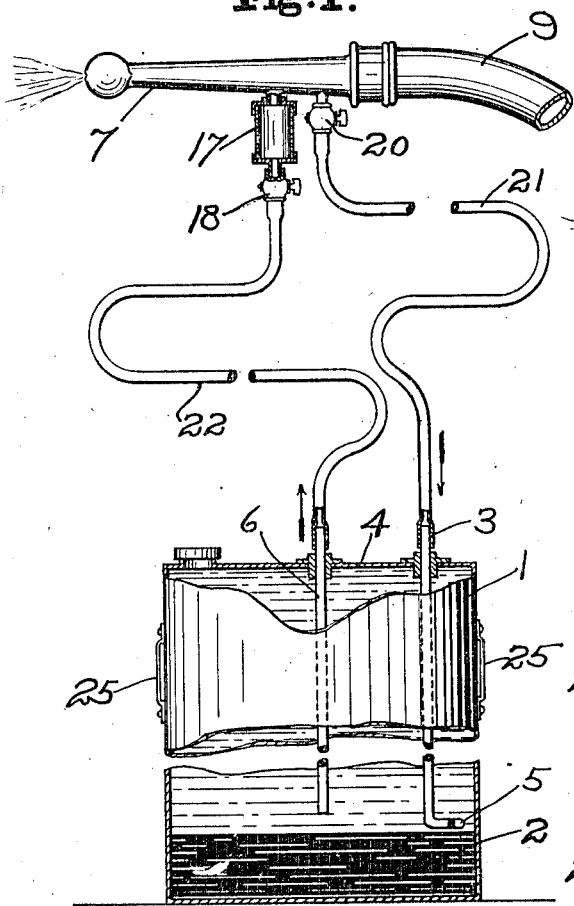
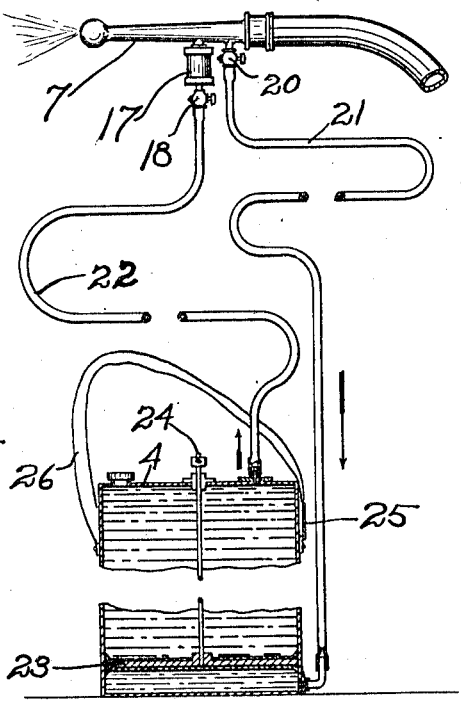
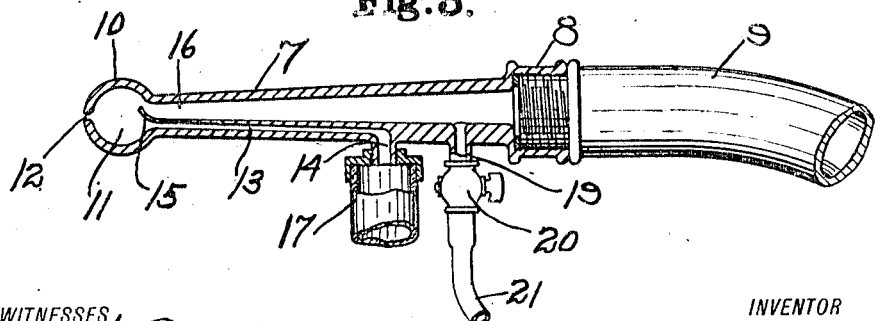
WITNESSES
Willard H. Bardsley.
E. D. Ogden
INVENTOR
William B. Inglis.
BY Howard E. Barlow
ATTORNEY

UNITED STATES PATENT OFFICE.

WILLIAM B. INGLIS, OF PAWTUCKET, RHODE ISLAND, ASSIGNOR OF ONE-HALF TO BERNARD J. DUFFY, OF PAWTUCKET, RHODE ISLAND.

SPRAYING APPARATUS.

956,101.  Specification of Letters Patent.  Patented Apr. 26, 1910.

Application filed September 3, 1909. Serial No. 516,033.

*To all whom it may concern:*

Be it known that I, WILLIAM B. INGLIS, a citizen of the United States, residing at the city of Pawtucket, in the county of Providence and State of Rhode Island, have invented certain new and useful Improvements in Spraying Apparatus, of which the following is a specification, reference being had therein to the accompanying drawing.

This invention relates to a spraying apparatus and has for its object to provide an improved device for automatically mixing insect destroying chemical soap, powder or solution with water, and to finally discharge the mixture in the form of a spray or stream into the trees or shrubbery.

A still further object is to provide a mixing chamber of novel type at the end of the nozzle which is adapted to thoroughly blend, combine or mix the solution with the water under pressure before it is forced therefrom in the form of a spray.

With these and other objects in view, the invention consists of certain novel features of construction, as will be more fully described and particularly pointed out in the appended claim.

In the accompanying drawings: Figure 1— shows the spraying apparatus partly in section, the tank being adapted to retain a chemical soap or other insect destroyer chemicals, that is soluble in water, the same being dissolved and mixed with inflowing water in the proper proportions and forced up into the nozzle where it is again diluted and combined or mixed with the water, under pressure, and subsequently discharged from the nozzle. Fig. 2— is a side elevation of a similar apparatus the tank being in section and showing a piston located therein adapted to be forced upward by a pressure of water to discharge the contents of the tank into the spraying nozzle. Fig. 3— is an enlarged sectional view of the spraying nozzle.

Referring to the drawings, 1 designates a plain tank or receptacle adapted to receive insect destroying chemicals. A specially prepared chemical soap is preferably deposited in this tank which is adapted to solidify or cake, as illustrated at 2, on the bottom of the tank. The inlet pipe 3 is adapted to project down into this tank through the head 4, its lower end being preferably curved as at 5 so as to start the water to rotate or to receive a whirling motion around the sides of the tank and over the face of the soap to mix with or make a suds from the soap, which suds or mixture is forced out through the outlet pipe 6 which extends down into said tank through the head 4.

The nozzle 7, see Fig. 3, is adapted at one end 8 to screw onto the ordinary hose 9 through which the water under pressure is connected. The opposite or discharge end of this nozzle 10 is made into the shape of a hollow ball forming a mixing chamber 11. A small discharge aperture 12 is provided in the end of the ball through which the mixture is forced. A feature of this invention is that a narrow inlet passageway 13 is formed in the wall of this nozzle leading from the inlet point 14 into the mixing chamber, the wall of said channel being curved as at 15 toward the water inlet opening 16 so that as the water enters the mixing chamber it will take a whirling motion around the wall of the same so as to draw in the solution and thoroughly mix the same with the water under pressure before discharging the whole through the opening. At the inlet point 14 is an outwardly extending teat or boss threaded to receive the attaching end of a glass sight feed 17, the opposite end of said feed being provided with a shut-off or controlling valve 18. Near the screw attaching end of the nozzle is an outlet 19 controlled by a valve 20 which is connected by a pipe 21 to the storage tank below. The supply or return from the said tank leads up through the pipe 22, controlling valve 18, and sight feed 17, through the channel 13 into the mixing chamber 11.

The apparatus illustrated in Fig. 2 is similar in effect and construction to that illustrated in Fig. 1, the only difference being that the tank inlet pressure pipe 21 instead of being connected in the top of the storage tank, as shown in Fig. 1, is connected into the lower portion of said tank, which tank is provided with a piston 23 arranged with suitable packing on its edges and having a steadying guide rod 24 extending up through its head 4.

The operation of the device is more particularly described as follows: In some cases it is desired to use a chemical soap and in other cases a chemical solution is preferred. When the chemical soap is used the same is preferably deposited in a water-tight receptacle, as illustrated in Fig. 1. The water under pressure from the supplying hose is allowed to pass down through the pipe 21 into the tank where it receives a whirling motion over the surface of the soap, dissolving the same a little at a time and making a suds of the proper consistency, the suds being then forced out through outlet pipe 22 into the nozzle where it is again mixed with the water under pressure and finally discharged through the nozzle opening onto the trees or shrubbery. When a solution is used it is preferably deposited in a tank containing a piston, such as that illustrated in Fig. 2, the water pressure like that in Fig. 1 being allowed to pass through the controlling valve 20, pipe 21, but instead of into the top of the tank, is admitted to the bottom of the tank beneath the piston whereby the solution is forced from the upper portion of the tank through the outlet pipe 22 into the nozzle to be mixed with the water under pressure and finally discharged as desired. A feature of this last arrangement is that the solution will remain the same strength or consistency until the whole has been discharged from the tank.

The storing tank 1 of my improved apparatus is provided with ears 25 to which a strap 26 is connected for the purpose of slinging the tank onto the back or over the shoulders of the operator so that he may carry the tank with him, if desired, when ascending a ladder to spray a tall tree.

A feature in the arrangement of my apparatus is that the nozzle is separate and independent of the tank and only connected therewith by flexible pipes or tubes. This enables a tank of considerable size to be used and rested upon the ground or carried on the back of the operator, leaving the nozzle entirely free to be manipulated in the hands of the operator, which arrangement is found much more effective and satisfactory than where the solution carrying tank is connected rigidly to the distributing nozzle.

I do not restrict myself to the use of this device for spraying trees and shrubbery, as the same may be used for washing windows or for any purpose for which it may be adapted.

The device is simple and inexpensive in its construction and extremely efficient and effective in its operation.

Having thus described my invention, what I claim as new and desire to secure by Letters Patent, is:

In a spraying device, a storage tank, a spraying nozzle, said nozzle being formed in one of its walls with a narrow passage way one end of which extends through the said wall of the nozzle and has connection with the tank, the wall of the passage way at its opposite end being curved upwardly toward the water passage proper of the nozzle, a hollow ball carried by the nozzle at its discharge end and formed with a peripheral discharge opposite said curved wall, means to connect the nozzle to a water supply, and means connecting the tank with the water passage proper of the nozzle.

In testimony whereof I affix my signature in presence of two witnesses.

WILLIAM B. INGLIS.

Witnesses:
HOWARD E. BARLOW,
E. I. OGDEN.